United States Patent

[11] 3,568,084

[72] Inventor Maximiliaan Hubert Bodmer
Hengelo, Netherlands
[21] Appl. No. 787,047
[22] Filed Dec. 26, 1968
[45] Patented Mar. 2, 1971
[73] Assignee N. V. Hollandse Signaalapparaten
Hengelo, Netherlands
[32] Priority Jan. 4, 1968
[33] Netherlands
[31] 6800097

[54] CIRCUIT FOR CONTROLLING THE FREQUENCY OF A HIGH FREQUENCY GENERATOR
10 Claims, 3 Drawing Figs.

[52] U.S. Cl. ........ 331/9,
331/9, 331/22, 331/25, 331/31
[51] Int. Cl. ........ H03b 3/04
[50] Field of Search ........ 331/5, 6, 9,
18, 22, 25, 30, 31

[56] References Cited
UNITED STATES PATENTS

| | | | |
|---|---|---|---|
| 2,486,001 | 10/1949 | Bruck et al. .......... | 331/9 |
| 2,917,713 | 12/1959 | Grauling, Jr. .......... | 331/6 |
| 3,283,261 | 11/1966 | Buck .......... | 331/9 |

*Primary Examiner*—John Kominski
*Assistant Examiner*—Siegfried H. Grimm
*Attorney*—Frank R. Trifari

ABSTRACT: The output of an oscillator is applied to two transmission paths having equal electrical and physical lengths. The first path contains a resonator of a selected frequency; the second path an I. F. modulator. The outputs of the two paths are mixed and then phase detected producing a signal which controls the frequency of the oscillator, setting it to the selected frequency.

INVENTOR

BY MAXIMILIAAN H. BODMER

AGENT

INVENTOR
BY
MAXIMILIAAN H. BODMER

AGENT

INVENTOR
BY MAXIMILIAAN H. BODMER
Frank R. Trifari
AGENT

CIRCUIT FOR CONTROLLING THE FREQUENCY OF A HIGH FREQUENCY GENERATOR

This invention relates to a high frequency stabilizing arrangement comprising a resonator and a modulator, and further a directive coupler and a hybrid coupler for feeding part of the output energy, from a high frequency generator to be stabilized to both the resonator and modulator, the resonator being tuned to the desired frequency of the generator, said resonator providing a signal, the phase shift of which is a measure of the deviation from the desired generator frequency, and also comprising a mixer and phase-sensitive detector, to which the output signal of said mixer is applied as well as the modulation signal as a reference, the desired error voltage for adjusting the generator frequency being obtained from the output of said phase sensitive detector.

Several embodiments of such a high frequency stabilizing arrangement are already known. In these embodiments the hybrid coupler is constituted by a magic-T in which the directive coupler is connected to the H plane arm, whilst the resonator, the modulator and the mixer are connected to the three remaining arms of the magic-T. Such high frequency stabilizing arrangements suffer from several disadvantages, that is to say, instabilities in the frequency control owing to reflections occurring, and a limited bandwidth as a result of differences in path length.

An object of the invention is to provide a high frequency stabilizing arrangement of the kind mentioned in the preamble, in which the above-mentioned disadvantages are met to a considerable extent. According to the invention, to this end, the hybrid coupler is connected to the mixer through two separate channels of equal path length, at least one circulator being provided by means of which the resonator is included in one channel while the modulator is included in the other channel.

A favourable bandwidth is found to be obtained if the two channels not only have the same electrical path length but also have the same real path length. The requirement that the two channels have the same electrical path length appears to be insufficient.

Figure 1:
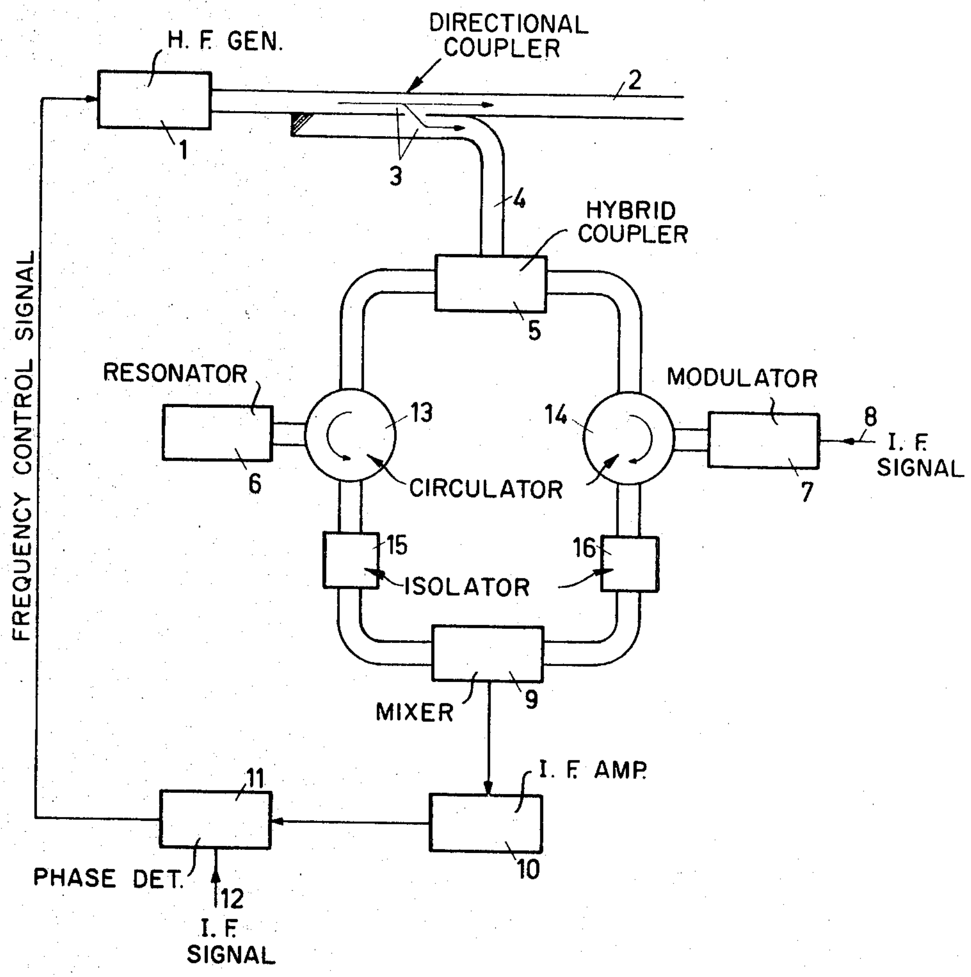
Figure 2:
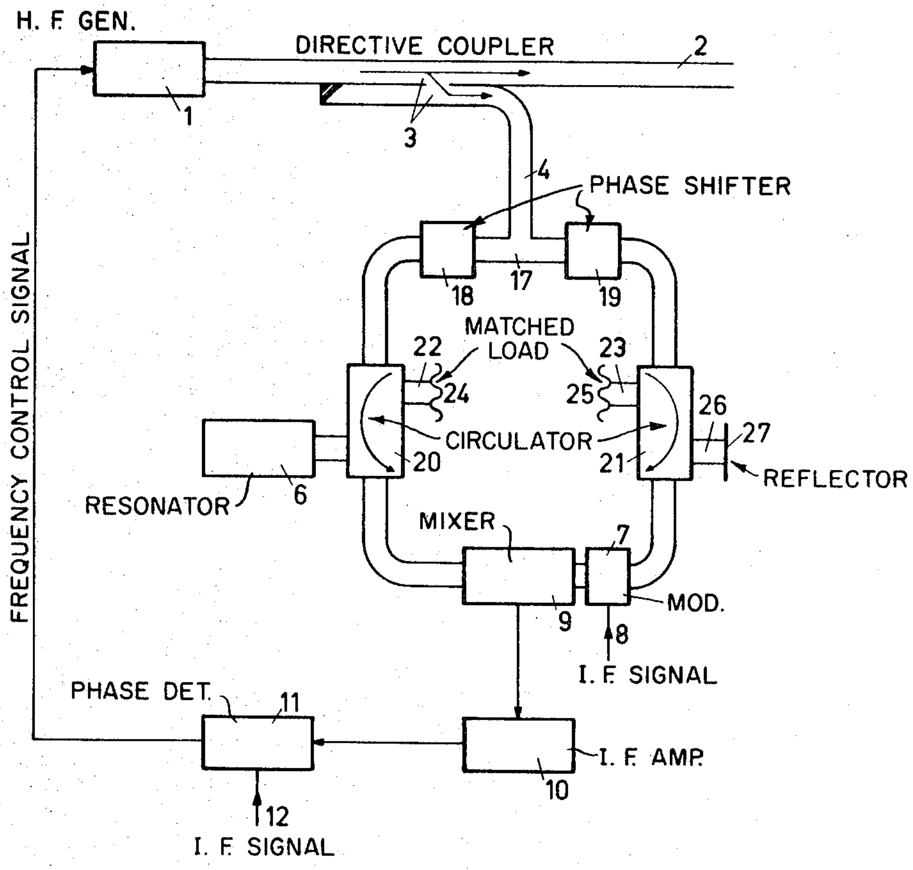
Figure 3:
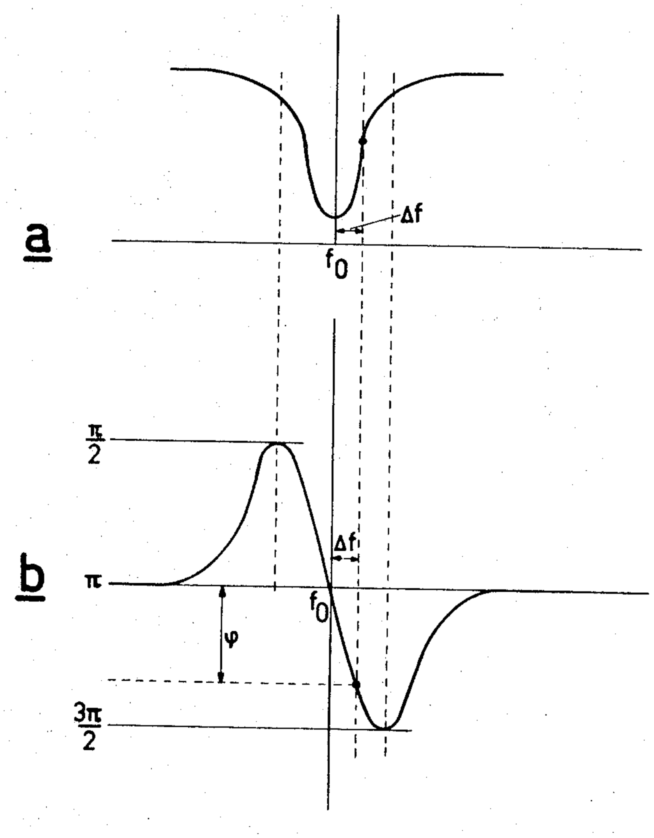

In order that the invention may readily be carried into effect, it will now be described in detail, by way of example, with reference to the accompanying diagrammatic drawings, in which:

FIGS. 1 and 2 show the block diagrams of two embodiments of a high frequency stabilizing arrangement according to the invention, and FIG. 3 shows two diagrams to explain the operation of the high frequency stabilizing arrangement.

Identical elements of FIGS. 1 and 2 are indicated by the same reference numerals.

The block diagram of FIG. 1 shows a high frequency generator 1 having a control member for readjusting the frequency of the generator by means of an error voltage applied to the said control member. The high frequency generator 1 is connected to an output waveguide 2, but part of the energy from the high frequency generator is passed through a directional coupling 3 and a waveguide 4 to a hybrid coupler 5. This hybrid coupler divides the energy equally over a resonator 6 and a modulator 7. The resonator has a tuning frequency $f_0$, which corresponds with the desired frequency of the generator. When the high frequency generator has the desired frequency $f_0$ the resonator is fully matched to an input signal of such a frequency, that is to say minimum reflections occur (of the order of −30 db) and the reflected signal is shifted in phase by $+\pi$ relative to the incoming signal. In FIG. 3*a* the absolute value for the reflection of the frequency of the incoming signal. FIG. 3*b* shows the phase shift of the reflected signal relative to the input signal, likewise as a function of the frequency of the input signal. If the frequency of the generator exhibits a deviation $\Delta f$ from the frequency desired, the signal reflected from the resonator will show a phase shift of $\pi \pm \Phi$ relative to the input signal, i.e. a phase shift of $\pi + \Phi$ if $\Delta f > 0$ and of $\pi - \Phi$ if $\Delta f < 0$. The output signal of the generator is modulated in the modulator 7 by an intermediate frequency signal applied through a lead 8. In a mixer 9, the modulated signal is transformed to intermediate frequency level and after amplification in a intermediate frequency amplifier 10 applied to a phase-sensitive detector 11. The modulating signal is also applied to said phase-sensitive detector through a lead 12 and serves as a reference signal for the phase-sensitive detector. The latter provides a signal the sign and amplitude of which are a measure of the deviation from the desired frequency of the generator. This signal serves as an error voltage for readjusting the frequency of the generator.

According to the invention, an advantageous high frequency stabilizing arrangement is obtained if the hybrid coupler 5 is connected to the mixer 9 through two separate channels of the same path length, and if at least one circulator 13 is provided by means of which the resonator 6 is included in one of said channels, while the modulator 7 is included in the other channel. By the use of separate channels it is avoided that unwanted phase shifts resulting from reflections may occur in the signal to be detected. Such unwanted phase shifts would imply incorrect error voltages for readjusting the frequency of the generator and hence instabilities in the frequency control.

The embodiment here described includes a second circulator 14, by means of which the modulator 7 is included in the said other channel. The symmetry and hence the equal path length of the two channels is thus obtained in a simple manner. The senses of rotation in the two circulators, which are indicated by arrows in FIG. 1, are such that the energy from the hybrid coupler passes directly to the resonator and the modulator and then to the mixer. The circulators in the embodiment of FIG. 1 are of the three-port type. In order to prevent reflections from the mixer towards the hybrid coupler, isolators 15 and 16, respectively, are included after the ports of the circulators coupled to the mixer.

In the high frequency stabilizing arrangement described so far, an equal electrical path length of the two channels can be obtained indeed, but this does not imply that an equal real path length is realized at the same time. Yet an equal real path length is necessary for obtaining a broad frequency band. The output signal from the phase-sensitive detector 11 may be represented by the expression:

$$y = C\left|\rho\right| m \cos(1 + \pi \pm \Phi)$$

in which $C$ is a constant, $m$ is the modulation depth and $\left|\rho\right|$ is the absolute value of the reflection coefficient of the resonator; 1 indicates the difference in real path length between the two separate channels, expressed in radians. If the high frequency generator has the desired frequency, that is to say $\Phi = 0$, it is necessary that $y = 0$. This is possible only if $\cos(1 + \pi) = 0$ and hence a difference in real path length of $\frac{1}{2}\pi \pm k\pi$ ($k = 0, 1, 2 \ldots$) is introduced. If the hybrid coupler is constituted by a short-slot hybrid, it is possible to obtain two channels of the same path length. A more complicated solution is obtained by designing the hybrid coupler as a H-plane T-junction in which the two channels include +45° and −45° phase shifters respectively. In the embodiment of FIG. 2, the H-plane T-junction is indicated by 17 and the two waveguide phase shifters by 18 and 19 respectively.

In the embodiment of FIG. 2, the modulator is included in the relevant channel without the use of a circulator, that is to say directly before the mixer 9, thus preventing differences in electrical path length as caused by the frequency variation due to the modulation in one of the channels. However, in order to obtain an optimum bandwidth, the embodiment of FIG. 2 also includes a second circulator in the relevant channel. This second circulator is identical with the circulator in the other channel. One of the ports of the second circulator is provided with a reflector.

Finally, it is to be noted that in the embodiment of FIG. 1, the three-port circulators may be substituted by four-port circulators. In that case the use of isolators is not required. In the embodiment of FIG. 2, the four-port circulators are indicated by 20 and 21, respectively. In order to prevent reflections towards the hybrid coupler, ports 22 and 23 of the circulators 20 and 21, respectively, are provided with matched loads 24 and 25 respectively. The port 26 of circulator 21 is provided with a reflector 27.

I claim:

1. A circuit for controlling the frequency of a high frequency generator comprising first and second transmission paths having substantially equal electrical lengths; means for applying the output of said generator to one end of each of said paths; a first circulator located in said first transmission path; means for phase shifting the high frequency energy in said first path as a function of the difference between said high frequency generator frequency and a selected frequency; means for modulating the second path high frequency signal at an intermediate frequency rate; means for producing a signal having variations as determined by the extent of said phase shifts including means for mixing the high frequency energy of said paths coupled to said remaining ends of said paths; and means for controlling the frequency of said high frequency generator to a value equal to said selected frequency including a phase detector coupled to said mixing means for receiving said produced signal and said intermediate frequency signal, said detector being coupled to said high frequency generator.

2. A circuit as claimed in claim 1 further comprising a second circulator coupled in said second path and to said modulator.

3. A circuit as claimed in claim 2 further comprising first and second isolators coupled in said first and second paths respectively, between said first and second circulators respectively, and said mixing means.

4. A circuit as claimed in claim 2 wherein said circulators each comprise four ports, and further comprising a matched load coupled to one of said ports of said first circulator, and a reflector coupled to one of said ports of said second circulator.

5. A circuit as claimed in claim 1 wherein said applying means comprises a hybrid coupler.

6. A circuit as claimed in claim 5 wherein said hybrid coupler comprises a short-slot hybrid.

7. A circuit as claimed in claim 5 wherein said hybrid coupler comprises an H-plane T-junction having +45° and −45° phase shifters in said first and second paths respectively.

8. A circuit as claimed in claim 2 wherein said modulation means is located between said second circulator and said mixing means.

9. A circuit as claimed in claim 2 wherein said modulation means is external to said second path.

10. A circuit as claimed in claim 1 wherein said phase shifter comprises a resonator coupled to said first circulator and having a resonant frequency equal to said selected frequency.